Patented Aug. 23, 1932

1,873,490

UNITED STATES PATENT OFFICE

RUDOLF SCHULZE, OF BITTERFELD, GERMANY, ASSIGNOR TO I. G. FARBENINDUSTRIE AKTIENGESELLSCHAFT, OF FRANKFORT-ON-THE-MAIN, GERMANY

PROCESS FOR SEPARATING POTASSIUM PHOSPHATE FROM POTASSIUM ALUMINATE IN SOLUTIONS

No Drawing. Application filed November 15, 1930, Serial No. 496,037, and in Germany November 23, 1929.

The present invention relates to an improved process for separating potassium phosphate from potassium aluminate in solutions.

When iron-alumina phosphates or raw materials containing said phosphates are treated with caustic potash lye, solutions are obtained, after separating the insoluble matter, which contain tri-potassium phosphate and potassium aluminate together with an excess of caustic potash lye. Similar solutions are produced when mixtures of iron and alumina phosphates with potash, or with sulfate of potassium and carbon, or with chloride of potassium and carbon in the presence of steam, are subjected to roasting and subsequent leaching.

Although the main object of the present invention is the separate recovery of the tri-potassium phosphate and the potassium aluminate from such solutions, the process according to the present invention is by no means restricted to that purpose but is equally applicable to the separation of said compounds whenever simultaneously present in solutions.

I have observed that the treatment of solutions containing both tri-potassium phosphate and potassium aluminate with ammonia gas results in the formation of two separate liquid layers and that the lower layer contains the bulk of the phosphoric acid in form of a concentrated solution of tri-potassium phosphate together with a smaller quantity of aluminate, whereas the upper layer contains most of the aluminate. I have further found that when more diluted phosphate aluminate solutions are treated in this manner the percentage of the potassium aluminate contained in the upper layer is increased at the expense of the quantity of that salt remaining in the lower layer. The potassium aluminate contained in the strongly ammoniacal upper layer is entirely stable as long as the solution still contains free alkali. In more concentrated solutions the distribution of the aluminate is somewhat shifted as an increasing amount of the aluminate tends to pass into the lower layer. It appears that the equilibrium of distribution of potassium aluminate is a function of the concentration of the solution: With equal parts by weight of $P_2O_5$ and $Al_2O_3$ in the original solution, the following percentages of aluminate will be found to be present in the upper ammoniacal layer:

| Concentration of tri-potassium phosphate in the solution | Concentration of potassium aluminate in the upper layer |
|---|---|
| Per cent | Per cent |
| 20 | 25 |
| 10 | 70 |
| 5 | 90 |

According to the present invention the starting solution containing tri-potassium phosphate and potassium aluminate in suitable concentration is therefore treated with ammonia gas and the upper liquid layer thus formed is removed in the usual manner. The remaining lower layer is then moderately diluted with water and further quantities of ammonia gas are introduced. The formation of two separate liquid layers thereupon again takes place and the upper liquid layer containing practically the entire remainder of the potassium aluminate is again removed and worked up either together with the first layer or separately into potassium aluminate.

Preferably the concentration of the respective solution is adjusted in such a manner as to effect complete separation with a minimum of dilution, which of course will depend on the composition of the starting material.

The ammonia is driven off from the separated solutions in the usual manner, for example, by evaporating, and is reused in the process.

The solution of tri-potassium phosphate may be worked up into potassium phosphates or into fertilizers, whereas the aluminate solution yields alumina and potash when subjected to a process known per se.

Example 100 kgs. of iron-alumina phosphate containing about 30 percent $Al_2O_3$, 8 percent $Fe_2O_3$ and 30 percent $P_2O_5$ are heated with 1800 kgs. of a 7 percent caustic potash solution to 60° C. for 5 hours. After removing the insoluble matter, ammonia gas is introduced at a temperature between 15 and 20° C. up to saturation. Two liquid layers are formed which are separated from each other. To the lower layer, after addition of 1000 kgs. of water, ammonia gas is again supplied until saturation is attained. The lower layer then formed contains not more than about 1 or 2 percent of the alumina originally present, whereas in the combined upper layers the $P_2O_5$ contents do not exceed about 3 percent of the original quantity. Working up of the separated solutions yield 83 kgs. tri-potassium phosphate, 28 kgs. alumina, 64 kgs. potash.

I claim:

1. A process which comprises saturating a solution containing tri-potassium phosphate and potassium aluminate with ammonia gas and separating the two liquid layers formed from each other.

2. A process which comprises saturating a solution containing tri-potassium phosphate and potassium aluminate with ammonia gas, separating the two liquid layers formed from each other, diluting the lower layer with a quantity of water, subjecting it to another treatment with ammonia gas, and recovering tri-potassium phosphate from the combined respective lower liquid layers and potassium aluminate from the combined respective upper liquid layers.

3. A process which comprises saturating a solution containing tri-potassium phosphate and potassium aluminate with ammonia gas, separating the two liquid layers formed from each other, diluting the lower layer with a quantity of water, subjecting it to another treatment with ammonia gas, and recovering tri-potassium phosphate from the combined respective lower liquid layers and potassium aluminate from the combined respective upper liquid layers, the ammonia gas being recovered by evaporation from solutions previously obtained in the same manner.

4. In a process of recovering alumina, potash and potassium phosphates from natural alumina phosphates, the steps of treating the natural alumina phosphate with caustic potash lye so as to obtain a solution containing both tri-potassium phosphate and alumina phosphate, saturating said solution with ammonia gas and working up the two liquid layers thus obtained into alumina, potash and potassium phosphate.

5. A process which comprises treating a solution containing tri-potassium phosphate and potassium aluminate with ammonia gas so as to attain a substantial ammonia concentration in the solution, and separating the two liquid layers thereupon formed from each other.

In testimony whereof, I affix my signature.

RUDOLF SCHULZE.